United States Patent
Han et al.

(10) Patent No.: US 11,355,085 B2
(45) Date of Patent: Jun. 7, 2022

(54) REPEATER DEVICE FOR DISPLAYPORT SIDE CHANNEL AND OPERATING METHOD THEREOF

(71) Applicant: QUALITAS SEMICONDUCTOR CO., LTD., Seoul (KR)

(72) Inventors: Seonghyeon Han, Seoul (KR); Pyungsu Han, Gunpo-si (KR); Kwang-Chun Choi, Seoul (KR)

(73) Assignee: QUALITAS SEMICONDUCTOR CO., LTD., Seoul (KR)

( * ) Notice: Subject to any disclaimer, the term of this patent is extended or adjusted under 35 U.S.C. 154(b) by 0 days.

(21) Appl. No.: 17/074,187

(22) Filed: Oct. 19, 2020

(65) Prior Publication Data
US 2022/0093060 A1 Mar. 24, 2022

(30) Foreign Application Priority Data
Sep. 20, 2020 (KR) .................. 10-2020-0121077

(51) Int. Cl.
*G06F 3/038* (2013.01)
*G09G 5/12* (2006.01)
*H04B 3/36* (2006.01)
*H04B 10/80* (2013.01)

(52) U.S. Cl.
CPC .............. *G09G 5/12* (2013.01); *H04B 3/36* (2013.01); *H04B 10/80* (2013.01); *G09G 2370/045* (2013.01); *G09G 2370/18* (2013.01); *G09G 2370/22* (2013.01)

(58) Field of Classification Search
CPC ...... G09G 5/12; G09G 2370/045; H04B 3/36; H04B 10/80
USPC ......................................... 345/208
See application file for complete search history.

(56) References Cited

U.S. PATENT DOCUMENTS

| | | | | |
|---|---|---|---|---|
| 2015/0207568 A1* | 7/2015 | Ying | .............. | H04B 10/40 398/135 |
| 2015/0358087 A1* | 12/2015 | Pavlas | .............. | H04B 10/508 398/182 |
| 2016/0203343 A1* | 7/2016 | Soffer | .............. | G06F 13/4022 726/34 |
| 2017/0078021 A1* | 3/2017 | Zhang | .............. | H04B 10/25891 |

FOREIGN PATENT DOCUMENTS

KR    10-1169282    8/2012

* cited by examiner

*Primary Examiner* — Jonathan M Blancha
(74) *Attorney, Agent, or Firm* — Novick, Kim & Lee, PLLC; Sang Ho Lee; Hyun Woo Shin

(57) ABSTRACT

Provided are a repeater device for a DisplayPort side channel and an operating method thereof. The repeater device of a DisplayPort includes: a source device processor transmits or receives an electrical signal of a side channel data of the display port to or from a source device and processes repeater data; and a sink device processor transmits or receives an electrical signal of a side channel data of the display port to or from a sink device and processes repeater data, wherein the source device processor or the sink device processor comprising a controller processes repeating of the side channel data of the display port using the repeater data which is obtained by transforming the electrical signal to an optical signal.

11 Claims, 6 Drawing Sheets

REPEATER DEVICE FOR DISPLAYPORT SIDE CHANNEL AND OPERATING METHOD THEREOF

BACKGROUND OF THE INVENTION

1. Technical Field

The present disclosure relates to a repeater device for a DisplayPort side channel and an operating method thereof and, more particularly, to a repeater device for a DisplayPort side channel, wherein a data signal for a link setup configuration for the transmission and reception of video or audio data and control of a device connected to both ends is converted and processed into a unidirectional signal and an optical signal and transmitted or received through an optical fiber cable, and an operating method thereof.

2. Description of the Related Art

Recently, with the development of the imaging technology, high-density images are popularized, and three-dimensional (3-D) images are also increased. In line with the development of such a technology, next-generation display technologies variously appear. Furthermore, the DisplayPort is widely used as an interface for a next-generation display. The DisplayPort may be composed of connectors connected to interfaces provided by a source device and a sink device, respectively. The DisplayPort includes a main link, an auxiliary channel, and a hot plug detect (HPD) signal line to enable a physical connection between the source device and the sink device. The main link is a channel having a high bandwidth, for transmitting video and audio data from the source device to the sink device. Furthermore, the DisplayPort includes the auxiliary channel for bi-directionally transmitting and receiving signals that provide a function for controlling and managing the link and the device and a channel for transmitting the HPD signal.

In relation to a technology for assisting normal output of such a high-density image, there is disclosed Korean Patent No. 10-1169282 entitled "METHOD FOR CONTROLLING HIGH DEFINITION MULTIMEDIA INTERFACE USING HOT PLUG DETECT SIGNAL AND DISPLAY UNIT ENABLING OF THE METHOD." The patent describes a high definition multimedia interface (HDMI) control method of efficiently stabilizing the synchronization of data received from an external input device by controlling the equalizer of an HDMI receiver using the HPD delay time of an HPD signal, and a method of efficiently stabilizing the synchronization of data.

However, such a conventional technology has a limit to be applied to the DisplayPort due to its technical contents restricted to an HDMI interface method.

Furthermore, such a conventional technology has a limit in that it does not describe a method capable of overcoming the limits of a noise influence, a data loss, and a transmission distance, which may occur when a setup link for a control signal is configured using a copper-wired waveguide, in addition to the main link through which video and voice data is transmitted and received.

SUMMARY OF THE INVENTION

The present disclosure has been made keeping in mind the above problems occurring in the prior art, and the present disclosure provides a repeater device for a DisplayPort side channel, wherein signal transactions of an AUX channel that enables setup between a link and a device and control thereof, for a connection between a source provision device and a source output device and the high-speed transmission and reception of video and audio data, and a data signal, such as hot plug detect (HPD), are configured as a unidirectional signal, the unidirectional signal is converted into an optical signal, and the optical signal is transmitted or received between both ends at a high speed through an optical fiber cable, and an operating method thereof.

In an embodiment, a method includes receiving, by a source device processor, an electrical signal from a source device; receiving, by a sink device processor, an electrical signal from a sink device; transmitting, by the source device processor, to the sink device processor, repeater data obtained by converting and processing the electrical signal, received from the source device, into an optical signal and transmitting, to the source device, repeater data obtained by converting and processing an optical signal, received from the sink device processor, into an electrical signal; and transmitting, by the sink device processor, to the source device processor, repeater data obtained by converting and processing the electrical signal, received from the sink device, into an optical signal and transmitting, to the sink device, repeater data obtained by converting and processing an optical signal, received from the source device processor, into an electrical signal.

In an embodiment, an apparatus includes a source device processor configured to transmit or receive an electrical signal to or from a source device and to process repeater data and a sink device processor configured to transmit or receive an electrical signal to or from a sink device and to process repeater data. The source device processor includes a source controller configured to transmit, to the sink device processor, repeater data obtained by converting and processing an electrical signal, received from the source device, into an optical signal and transmit, to the source device, repeater data obtained by converting and processing an optical signal, received from the sink device processor, into an electrical signal. The sink device processor includes a sink controller configured to transmit, to the source device processor, repeater data obtained by converting and processing an electrical signal, received from the sink device, into an optical signal and to transmit, to the sink device, repeater data obtained by converting and processing an optical signal, received from the source device processor, into an electrical signal.

In an embodiment, a method may be implemented by a program for executing the method in a computer and a recording medium in which the program has been written.

DETAILED DESCRIPTION

Figure 1:
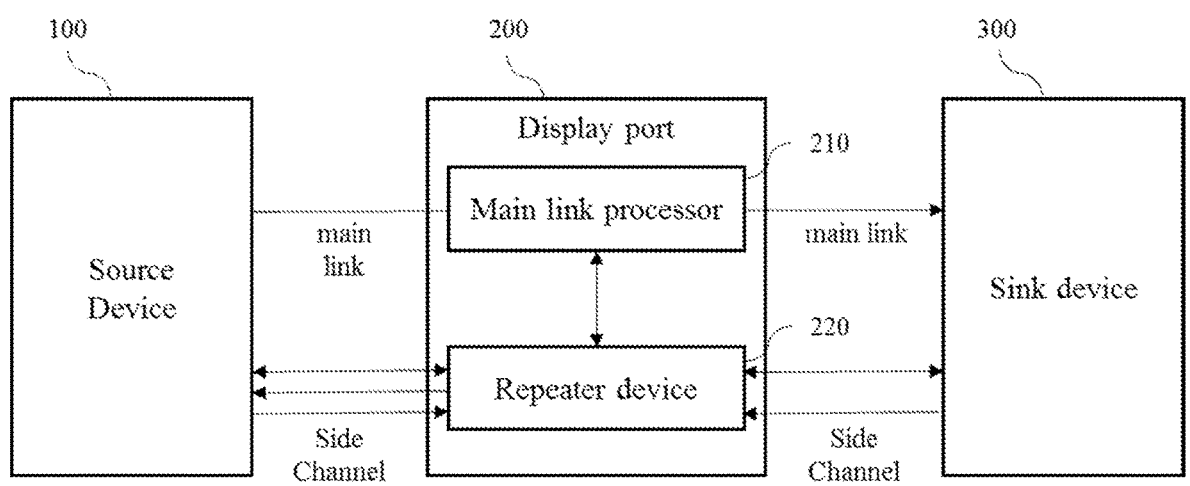
FIG. 1 is a conceptual diagram schematically illustrating an overall system according to an embodiment of the present disclosure.

The present disclosure may be changed in various ways and may have various embodiments. Specific embodiments are illustrated in the drawings and are described in detail through the detailed description.

It is however to be understood that the present disclosure is not intended to be limited to the specific embodiments and the present disclosure includes all changes, equivalents and substitutions which fall within the spirit and technological scope of the present disclosure.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

All terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, preferred embodiments of the present disclosure are more specifically described with reference to the accompanying drawings. In describing the present disclosure, in order to help general understanding, the same reference numerals are used to denote the same elements throughout the drawings, and a redundant description of the same elements is omitted.

Figure 2:
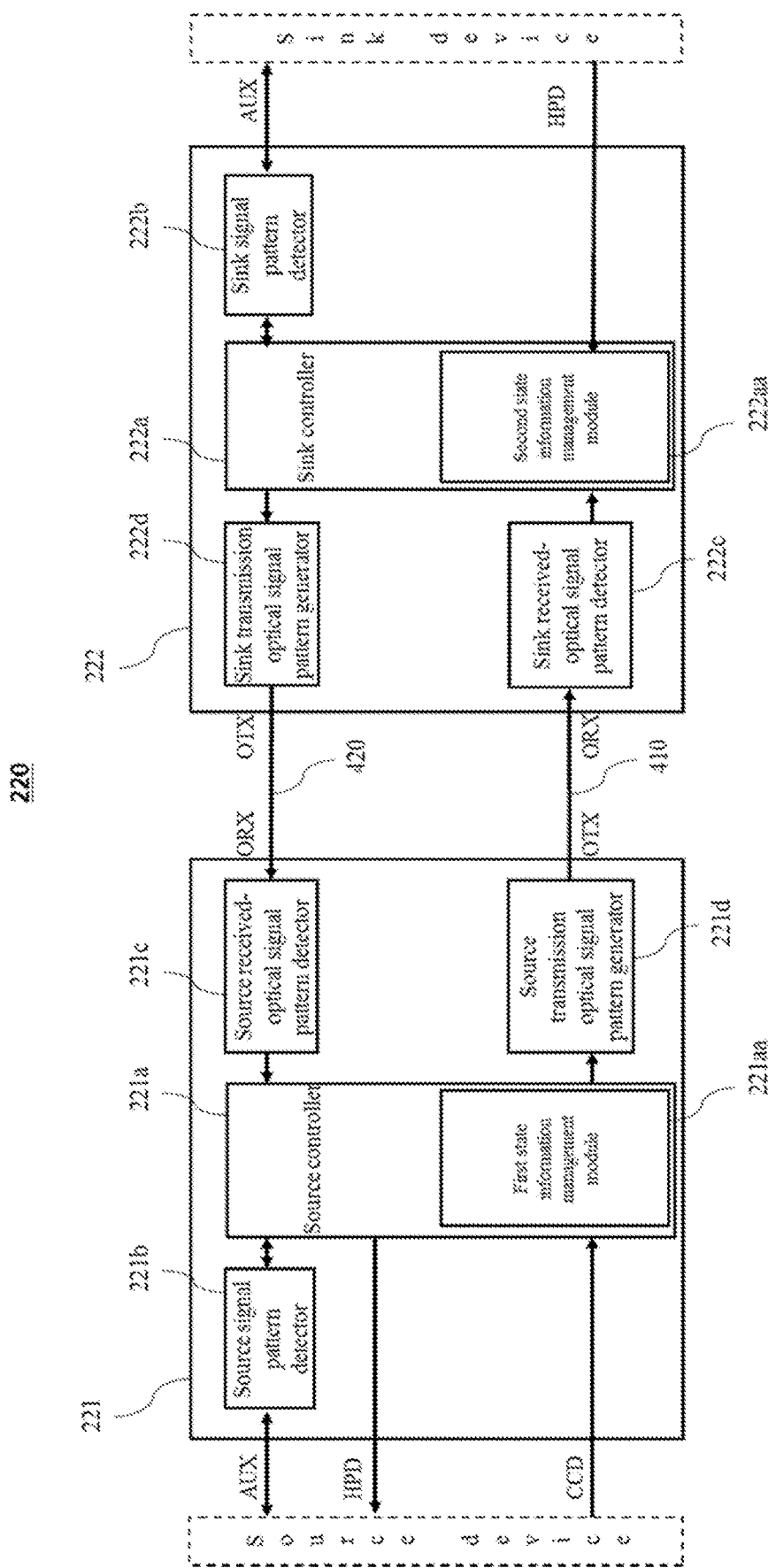
FIG. 2 is a block diagram for describing the structure of a repeater device for a DisplayPort side channel according to an embodiment of the present disclosure.

FIG. 1 is a conceptual diagram schematically illustrating an overall system according to an embodiment of the present disclosure. FIG. 2 is a block diagram for describing the structure of a repeater device for a DisplayPort side channel according to an embodiment of the present disclosure.

First, referring to FIG. 1, the system according to an embodiment of the present disclosure includes a source device 100, a DisplayPort 200, and a sink device 300.

The source device 100 provides video or audio data, and provides data which may be output through a DVD player or a PC so that visual or auditory information can be recognized by a person.

The source device 100 may include a multimedia interface including a cable and a terminal for transmitting video and sound signals between a video source device and an image display device, such as television (TV) or a monitor.

The DisplayPort 200 may be physically connected to interfaces provided by the source device 100 and the sink device 300. The DisplayPort 200 may include a main link processor 210. The main link processor 210 transmits and processes video data and voice data from the source device 100 to the sink device 300 through a main link. The main link is a communication channel through which data signal is unidirectionally from the source device 100 to the sink device 300. Furthermore, the main link consists of an optical fiber cable, and may prevent a data loss and overcome a data signal transmission limit attenuated according to a transmission distance.

The DisplayPort 200 may further include a repeater device 220 for performing processing data between the source device 100 and the sink device 300 through the main link necessary for the transmission and reception of multimedia data and through a side channel, that is, a link including a control signal or set up signal of a device, etc.

The repeater device 220 classifies, as a unidirectional signal, data that belongs to a bidirectional signal generated by the source device 100 or the sink device 300 and that needs to be transmitted to a device connected to the other end. Thereafter, the repeater device 220 converts the unidirectional signal, that is, an electrical signal, into an optical signal so that the optical signal is transmitted through the optical cable.

The side channel may include an auxiliary (AUX) channel signal that processes information of the sink device 300, that is, a display device such as a monitor, so that the source device 100 checks and outputs the information. Specifically, the AUX channel signal may include a signal that controls and manages a connection device and a connection link through which the transmission of video and audio data is performed. To this end, the AUX channel signal may include extended display identification data (EDID) containing information on output parameters, such as product information, a video input type, a display size, power management, color characteristics, timing information, etc. of resolution of the sink device 300.

Furthermore, the AUX channel signal may include high-bandwidth digital content protection (HDCP). The HDCP is a copyright protection technology for encrypting a digital signal transmitted from a video playback device to a display device in order to prevent content from being illegally copied. Accordingly, a function for protecting the copyright of the owner or holder of source content can be used.

Additionally, the side channel may include hot plug detect (HPD), that is, a signal by which whether the source device 100 and the sink device 300 are connected can be checked.

Furthermore, the side channel may include a signal by which whether devices are connected can be checked through cable connected detect (CCD), that is, a cable connection detection signal.

The sink device 300 may include a device capable of receiving multimedia data, such as a video or audio provided by the source device 100, and outputting the multimedia data as visual or auditory information. For example, the sink device 300 may include a display terminal or a device, such as TV or a monitor.

Referring to FIG. 2, the DisplayPort 200 according to an embodiment of the present disclosure may include a repeater device 220. The repeater device 220 includes a source device processor 221 and a sink device processor 222.

The source device processor 221 may include a source controller 221a, a source signal pattern detector 221b, a source received-optical signal pattern detector 221c, and a source transmission optical signal pattern generator 221d.

The source controller 221a may include a first state information management module 221aa.

The first state information management module 221aa may generally analyze a pattern of an electrical signal or an optical signal, corresponding to a preset cable pin, with respect to repeater data composed of the electrical signal and the optical signal received by the source controller 221a. Accordingly, the first state information management module 221aa may identify a state transition step corresponding to a preset condition, based on an input signal. Furthermore, the source controller 221a may control the processing of the repeater data based on the identified state transition step.

Furthermore, the sink device processor 222 may include a sink controller 222a, a sink signal pattern detector 222b, a sink received-optical signal pattern detector 222c, and a sink transmission optical signal pattern generator 222d.

The sink controller 222a may include a second state information management module 222aa.

The second state information management module 222aa may generally analyze a pattern of an electrical signal or an optical signal, corresponding to a preset cable pin, with respect to repeater data composed of the electrical signal and the optical signal received by the sink controller 222a. Accordingly, the second state information management module 222aa may identify a state transition step, corresponding to a preset condition, based on an input signal. Furthermore, the sink controller 222a may control the processing of the repeater data based on the identified state transition step.

The source device processor 221 transmits or receives an electrical signal to or from the source device 100, and processes repeater data. The electrical signal may be transmitted through the side channel.

The side channel may include EDID, including a signal for controlling and managing the main link through which the transmission of video and audio data is performed, and product information, output information, etc. of the sink device 300, HDCP that enables the copyright protection of video and audio content, HPD that identifies a state indicating whether devices are connected, a CCD signal for detecting whether a cable is connected, etc.

The source controller 221a may transmit repeater data to the sink device processor 222 by converting and processing an electrical signal, received from the source device 100, into an optical signal.

Furthermore, the source controller 221a may transmit repeater data into the source device 100 by converting and processing an optical signal, received from the sink device processor 222, into an electrical signal.

The source signal pattern detector 221b may transmit, to the source controller 221a, a control and management processing signal for a connection link and connection device with the source device 100. The control and management processing signal is included in the side channel different from the auxiliary (AUX) channel.

Furthermore, the source ORX signal pattern detector 221c may transmit, to the source controller 221a, matching information that matches a preset pattern, based on an optical signal pattern received from the sink device processor 222.

Furthermore, the source transmission optical signal pattern generator 221d may generate a preset optical signal pattern based on an optical signal received from the source controller 221a, and may transmit the optical signal to the sink device processor 222.

The sink device processor 222 transmits or receives an electrical signal to or from the sink device 300, and processes repeater data. The electrical signal may include the side channel.

The sink controller 222a may transmit repeater data to the source device processor 221 by converting and processing an electrical signal, received from the sink device 300, into an optical signal.

Furthermore, the sink controller 222a may transmit repeater data to the sink device 300 by converting and processing an optical signal, received from the source device processor 221, into an electrical signal.

The sink signal pattern detector 222b may transmit, to the sink controller 222a, a control and management processing signal for a connection link and a connection device with the sink device 300.

Furthermore, the sink received-optical signal pattern detector 222c may transmit, to the sink controller 222a, matching information that matches a preset pattern, based on an optical signal pattern received from the source device processor 221.

Furthermore, the sink transmission optical signal pattern generator 222d may generate a preset optical signal pattern based on an optical signal received from the sink controller 222a, and may transmit the optical signal to the source device processor 221.

In this case, the source device processor 221 and the sink device processor 222 may have both ends connected by at least two optical fiber cables. For example, if the source device processor 221 and the sink device processor 222 are connected by two optical fiber cables, it may be said that the source device processor 221 and the sink device processor 222 are connected by two optical fiber cable cores. The first core of the two cores corresponding to the optical fiber cables may be used as the cable 410 of an optical (OTX) transmitter in the source device processor 221. Furthermore, the second core of the two cores may be used as the cable 420 of an optical (ORX) receiver in the source device processor 221. In such a division, from a viewpoint of a device connected to the other end, transmission and reception are reversely applied. For example, a cable that transmits an optical signal in the source device processor 221 is used as the cable 410 of an optical signal receiver in the sink device processor 222. Furthermore, a cable that receives an optical signal in the source device processor 221 may be connected to the cable 420 of an optical signal transmitter in the sink device processor 222 and used.

The source signal pattern detector 221b or the sink signal pattern detector 222b may transmit or receive a side channel, that is, a signal generated from the source device 100 or the sink device 300. The signal of an AUX channel included in the side channel enables the source device 100, such as a Blueray player or a PC, to obtain extended display identification data (EDID) containing information of the sink device 300, that is, a display device such as a monitor, and to process the output of the EDID. Furthermore, the copyright of content may be managed so that the content can be protected through high-bandwidth digital content protection (HDCP).

Electrical signals transmitted and received in the source device 100, the source device processor 221, the sink device 300, and the sink device processor 222 may include a signal (AUX) for controlling and managing a connection link and a connection device, a signal (HPD) for checking whether the sink device and the sink device processor are connected, and a signal (CCD) for checking whether the cables of the source device and the source device processor are connected.

The electrical signals may include the HPD signal for checking whether the sink device 300 and the sink device processor 222 are connected.

The HPD signal is used to request an interrupt from the sink device 300 or to detect whether the sink device 300 has been connected. For example, when the sink device is not connected, the HPD signal has its state information processed as "LOW" and transmitted to the sink controller 222a. In contrast, when the sink device 300 is connected, the HPD signal has its state information processed as "HIGH" and transmitted to the sink controller 222a.

Furthermore, the CCD signal may be used as a signal for checking whether the source device 100 and the source device processor 221 are connected. When the source device 100 is connected to the source device processor 221, the CCD signal has its state information processed as "LOW" and transmitted to the source controller 221a. In contrast, when the source device 100 is not connected to the source device processor 221, the CCD signal has its state information processed as "HIGH" and transmitted to the source controller 221a.

The source transmission optical signal pattern generator 221d or the sink transmission optical signal pattern generator 222d may configure an optical signal transmission method using an unplug pattern, an idle pattern, or a data pattern according to an optical signal clock cycle. To this end, the source transmission optical signal pattern generator 221d or the sink transmission optical signal pattern generator 222d may select a transmission method using one of the unplug pattern, the idle pattern, and the data pattern, and may generate a transmission pattern of repeater data.

The unplug pattern may be selected when devices are not connected by a link. The idle pattern may be selected when signals for controlling and managing a connection link and a connection device are not transmitted and received in the state in which devices have been connected by a link. Furthermore, the data pattern may be selected when signals for controlling and managing a connection link and a connection device are transmitted, so an optical signal may be transmitted.

The unplug pattern is transmitted, when the DisplayPort is not connected to the interface of the sink device 300 or an optical fiber cable is not connected to the interface of the sink device 300.

According to an embodiment of the present disclosure, the data pattern is actual AUX channel signal transmitted by the source device 100 or the sink device 300, and may include a method of transmitting an optical signal in a clock cycle designated within a range of 1 µs to 4 µs.

Furthermore, the idle pattern may include a method of transmitting an optical signal in a clock cycle designated within the range of less than 1 µs included in the data pattern. For example, the idle pattern may adopt a method of transmitting an optical signal in a clock cycle of 0.5 µs.

Furthermore, the unplug pattern may include a method of transmitting an optical signal in a clock cycle designated out of 4 µs included in the data pattern.

The unplug pattern and the idle pattern in which state information of a device is transmitted, among the three pattern methods, may be determined by avoiding a cycle which may be included in the data pattern. For example, Pre-charge included in AUX channel signal has an AUX_SYNC_END pattern having a clock cycle of 1 µs and a clock cycle of 4 µs. In this case, if the source transmission optical signal pattern generator 221d or the sink transmission optical signal pattern generator 222d transmits an idle pattern or unplug pattern having a clock cycle of 1 µs to 4 µs to the sink received-optical signal pattern detector 222c or the source ORX signal pattern detector 221c, the sink received-optical signal pattern detector 222c or the source ORX signal pattern detector 221c may misidentify the idle pattern or the unplug pattern with an AUX channel signal. For this reason, a pattern having a cycle faster or slower than the transmission cycle of the AUX channel signal may be used as the idle pattern or unplug pattern indicative of state information of a device.

Figure 3:
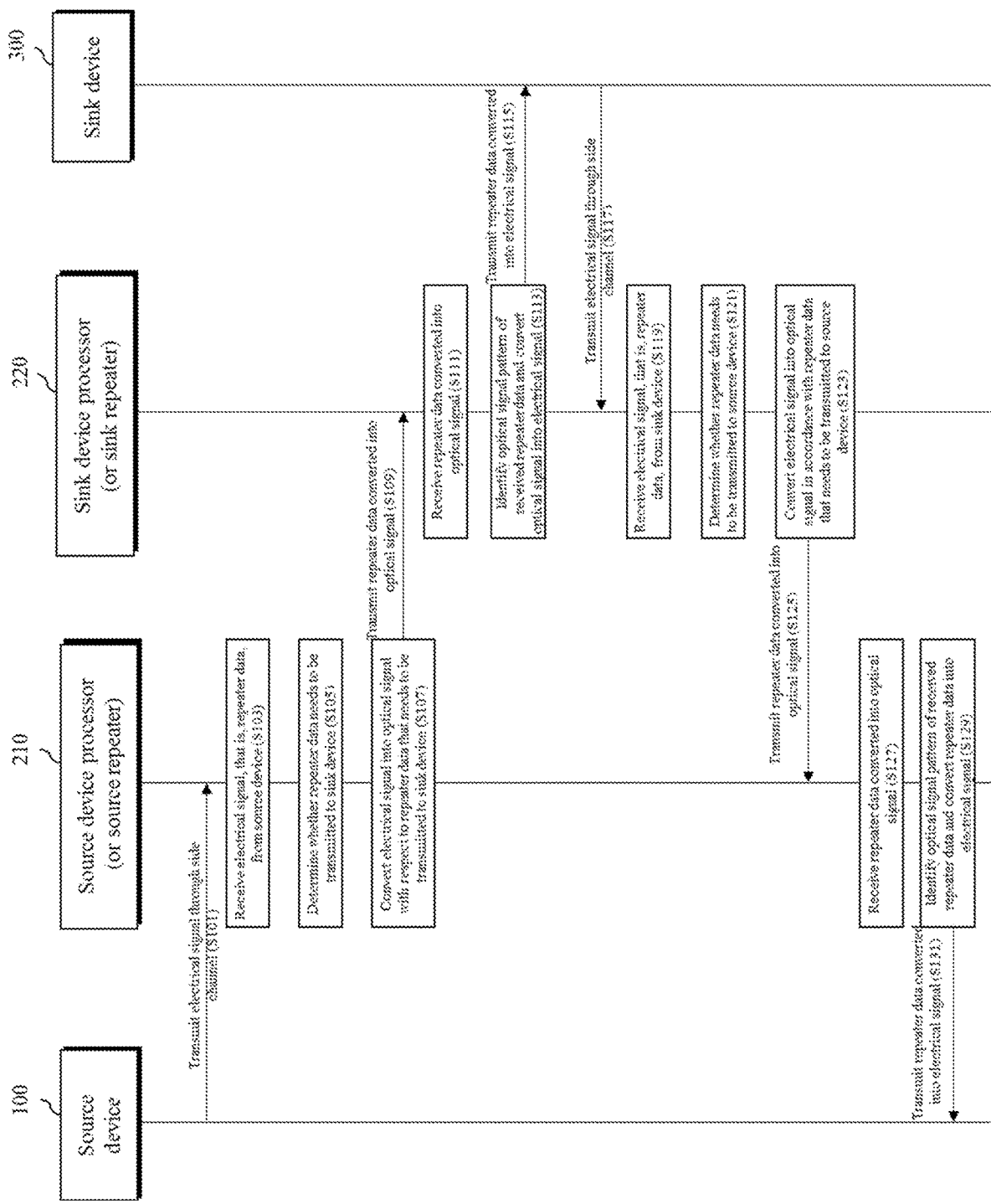
FIG. 3 is a ladder diagram for describing an operating method of the repeater device according to an embodiment of the present disclosure.

FIG. 3 is a ladder diagram for describing an operating method of the repeater device according to an embodiment of the present disclosure.

The operating method of the repeater device according to an embodiment of the present disclosure is described below based on the source device 100 with reference to FIG. 3.

The source device 100 transmits an electrical signal, that is, repeater data, to the source device processor 221 through the side channel (S101). Accordingly, the source device processor 221 receives the electrical signal from the source device 100 (S103). In this case, the source device processor 221 may transmit an electrical signal to the source device 100 in accordance with a signal that requires a response or processing signal in response to the electrical signal received by the source device processor 221.

The side channel may include an AUX channel signal that processes information of the sink device 300, that is, a display device such as a monitor, so that the source device 100, such as a Blueray player or a PC, checks and outputs the information. Specifically, the AUX channel signal may include a signal for controlling and managing a connection link through which the transmission of video and audio data is performed and a connection device. To this end, the AUX channel signal may include extended display identification data (EDID) containing information on output parameters, such as product information, a video input type, a display size, power management, color characteristics, timing information, etc. of resolution of the sink device 300.

Furthermore, the AUX channel signal may include high-bandwidth digital content protection (HDCP). The HDCP is a copyright protection technology for encrypting a digital signal transmitted from a video playback device to a display device in order to prevent content from being illegally copied. Accordingly, a function for protecting the copyright of the owner or holder of source content can be used.

Additionally, the side channel may include hot plug detect (HPD), that is, a signal by which whether the source device 100 and the sink device 300 are connected can be checked.

Furthermore, the side channel may include a signal by which whether devices are connected can be checked through cable connected detect (CCD), that is, a cable connection detection signal.

Thereafter, the source device processor 221 determines whether the repeater data received through the step of receiving the electrical signal from the source device 100 through the side channel needs to be transmitted from the source device 100 to the sink device 300 (S105).

Accordingly, the source device processor 221 converts the electrical signal, received from the source device 100, into an optical signal with respect to the repeater data that needs to be transmitted to the sink device 300 (S107).

The source device processor 221 transmits, to the sink device processor 222, the repeater data converted into the optical signal (S109).

Furthermore, the sink device processor 222 receives the repeater data converted into the optical signal by the source device processor 221 (S111).

The sink device processor 222 identifies an optical signal pattern of the received repeater data and converts the optical signal into an electrical signal (S113).

Thereafter, the sink device processor 222 transmits, to the sink device 300, the repeater data converted into the electrical signal (S115).

The step of receiving, by the source device processor 221, the electrical signal from the source device 100 may further include the step of detecting, by the source device processor 221, the transmission start and completion of a control and management signal for controlling and managing a connection link and a connection device, if the electrical signal received from the source device 100 is control and management a signal for the connection link and the connection device.

Furthermore, the step of converting, by the source device processor 221, the electrical signal received from the source device 100 into the optical signal and transmitting the repeater data to the sink device processor 222 may further include the step of generating an optical signal pattern according to preset pattern information based on the converted optical signal.

In addition, an operating method of the repeater device is described below based on the sink device 300.

The sink device 300 transmits an electrical signal, that is, repeater data, to the sink device processor 222 through the side channel (S117).

The sink device processor 222 receives the electrical signal from the sink device 300 (S119). In this case, the sink device processor 222 may transmit an electrical signal to the sink device 300 in response to a signal that requires a response or a processing signal in response to the electrical signal received by the sink device processor 222.

Thereafter, the sink device processor 222 determines whether repeater data received through the step of receiving the electrical signal from the sink device 300 through the side channel needs to be transmitted from the sink device 300 to the source device 100 (S121).

Accordingly, the sink device processor 222 converts the electrical signal, received from the sink device 300, into an optical signal in accordance with the repeater data that needs to be transmitted to the source device 100 (S123).

The sink device processor 222 transmits, to the source device processor 221, the repeater data converted into the optical signal (S125).

Furthermore, the source device processor 221 receives the repeater data converted into the optical signal by the sink device processor 222 (S127).

The source device processor 221 identifies an optical signal pattern of the received repeater data and converts the repeater data into an electrical signal (S129).

Thereafter, the source device processor 221 transmits, to the source device 100, the repeater data converted into the electrical signal (S131).

The step of receiving, by the sink device processor 222, the electrical signal from the sink device 300 may further include the step of detecting, by the sink device processor 222, the transmission start and completion of a control and management signal for controlling and managing a connection link and a connection device, when the electrical signal received by the sink device 300 is the control and management signal.

Furthermore, the step of converting, by the sink device processor 222, the electrical signal received from the sink device 300 into the optical signal and transmitting the repeater data to the source device processor 221 may further include the step of generating an optical signal pattern according to preset pattern information based on the converted optical signal.

The source device processor 221 and the sink device processor 222 may be connected by a core of at least two optical fiber cables. Each of the two cores may have a unidirectional data transmission path.

Figure 4:
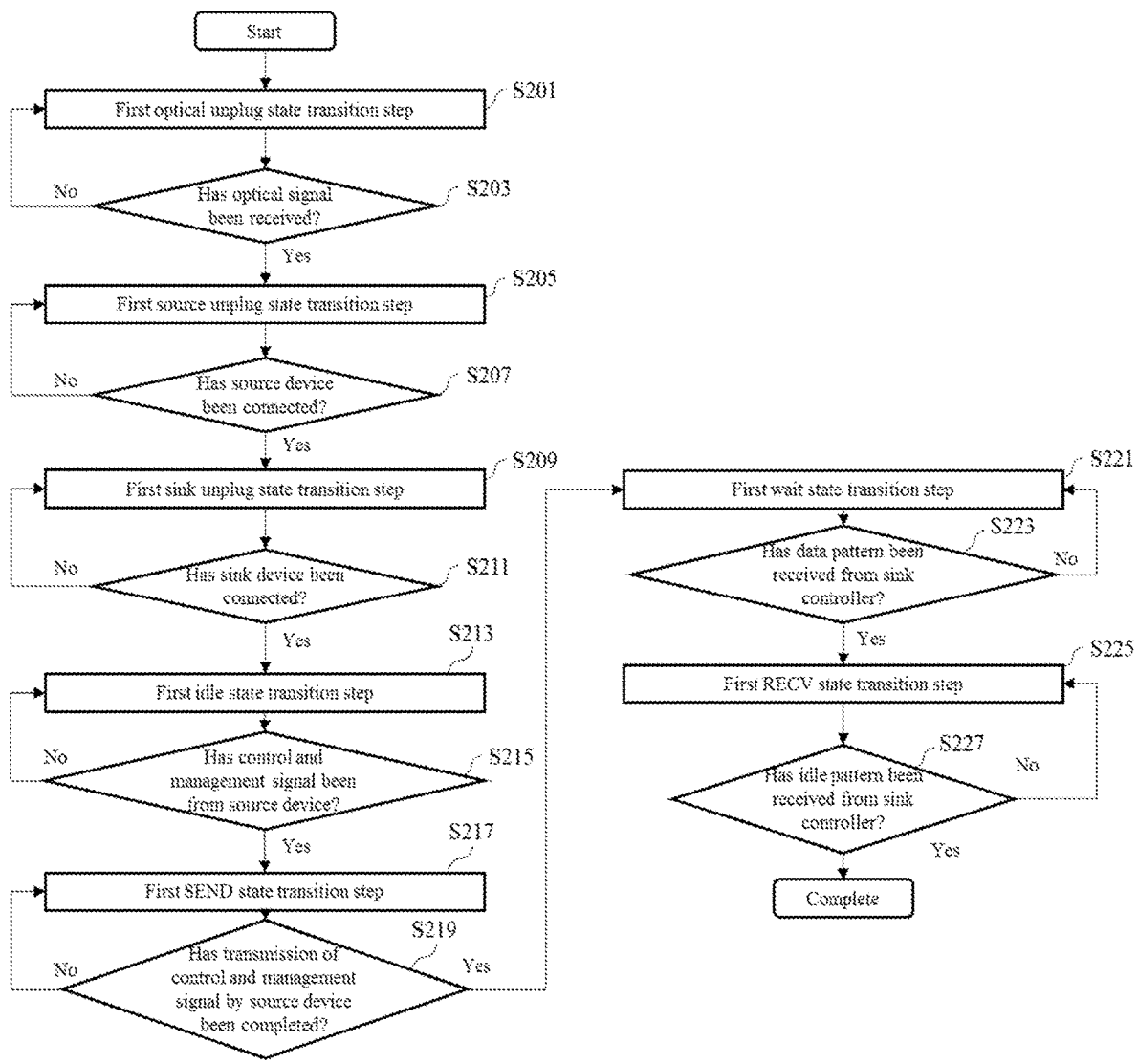
FIG. 4 is a flowchart for describing the processing of a data signal through the source device processor of the repeater device according to an embodiment of the present disclosure.

FIG. 4 is a flowchart for describing the processing of a data signal through the source device processor of the repeater device according to an embodiment of the present disclosure.

The processing of a data signal in each of steps in the source device processor 221 of the repeater device according to an embodiment of the present disclosure may be specifically described with reference to FIG. 4. In an embodiment of the present disclosure, steps for transmission to the source device may be classified as follows.

In a first optical unplug state transition step S201, a signal may be processed as follows, if an optical signal is not received from the sink device processor 222 in the state in which the source device processor 221 has not been connected to the source device 100 or the sink device 300.

The source controller 221a processes HPD as a "LOW" state in which the sink device 300 has not been connected. Furthermore, the source controller 221a generates an optical signal having an unplug pattern, having a clock cycle of 20 μs or more, through the source transmission optical signal pattern generator 221d, and transmits the optical signal to the sink device processor 222.

At this time, the source controller 221a determines whether the source device processor 221 receives the optical signal (S203).

When the source device processor 221 receives the optical signal, the source controller 221a shifts to a first source unplug state transition step S205, and may process a signal as follows in the state in which the source device 100 and the sink device 300 have not been connected.

The source controller 221a processes HPD as a "LOW" state in which the sink device 300 has not been connected, and transmits, to the sink device processor 222, an optical signal having an unplug pattern having a clock cycle of 20 μs or more.

At this time, the source controller 221a determines whether the source device 100 is connected to the source device processor 221 (S207).

When the source device 100 is connected to the source device processor 221, the source controller 221a shifts to a first sink unplug state transition step S209, and may process a signal as follows.

The source controller 221a changes the state of CCD from a "HIGH" state to a "LOW" state, and transmits, to the sink device processor 222, an optical signal having an idle pattern whose clock cycle is within a range of 10 ns to 90 ns. Furthermore, the source controller 221a may include the state in which an optical signal having an unplug pattern transmitted by the sink device processor 222 is received.

At this time, the source controller 221a determines whether the sink device 300 and the sink device processor 222 are connected (S211).

When the sink device 300 and the sink device processor 222 are connected, the source controller 221a may shift to a first idle state transition step S213, and may process a signal as follows.

In the first sink unplug state transition step, when the optical signal having the idle pattern whose clock cycle is within the range of 10 ns to 90 ns is transmitted from the sink device processor 222 to the source device processor 221, the source controller 221*a* determines that the sink device 300 has been connected, changes the state of HPD from a "LOW" state to a "HIGH" state, and waits so that the transactions of a control and management signal for controlling and managing a connection link and a connection device are performed.

At this time, the source controller 221*a* determines whether the source device processor 221 receives the control and management signal from the source device 100 (S215).

When the source device processor 221 receives the control and management signal from the source device 100, the source controller 221*a* may shift to a first transmission (SEND) state transition step (S217), and may process a signal as follows.

The source controller 221*a* converts the control and management signal, received from the source device 100, into an optical signal, and transmits the optical signal to the sink device processor 222.

At this time, the source device processor 221 determines whether the transmission of the control and management signal by the source device 100 is completed (S219).

When the transmission of the control and management signal by the source device 100 is completed, the source controller 221*a* may shift to a first wait state transition step S221, and may process a signal as follows.

The source controller 221*a* determines whether the transmission of the control and management signal has been completed, and waits in order to receive data from the sink device processor 222. The source controller 221*a* transmits, to the sink device processor 222, an optical signal having an idle pattern whose clock cycle is within a range of 10 ns to 90 ns.

At this time, the source controller 221*a* determines whether the control and management signal is received from the sink device processor 222 (S223).

When receiving the control and management signal from the sink device processor 222, the source controller 221*a* may shift to a first reception (RECV) state transition step S225, and may process a signal as follows.

The source controller 221*a* determines whether the source controller 221*a* receives the control and management signal from the sink device processor 222 (S227), and transmits the control and management signal to the source device 100.

Figure 5:
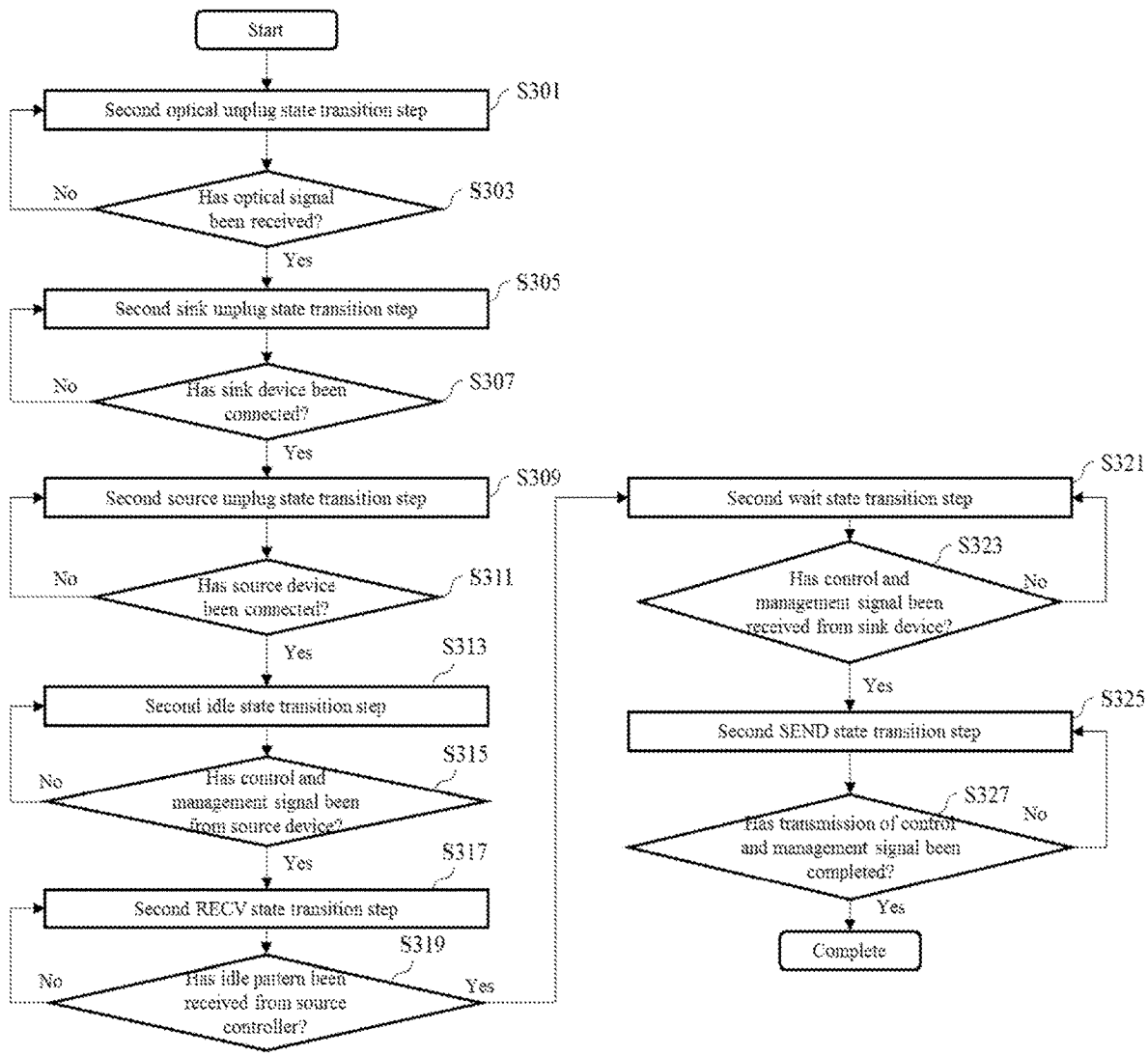
FIG. 5 is a flowchart for describing the processing of a data signal through the sink device processor of the repeater device according to an embodiment of the present disclosure.

FIG. 5 is a flowchart for describing the processing of a data signal through the sink device processor of the repeater device according to an embodiment of the present disclosure.

The processing of a data signal in each of steps in the sink device processor 222 of the repeater device according to an embodiment of the present disclosure may be specifically described with reference to FIG. 5. In an embodiment of the present disclosure, steps for transmission to the sink device may be classified as follows.

A signal may be processed as follows when an optical signal is not received from the source device processor 221 in the state in which the sink device 300 has not been connected to the sink device processor 222.

In a second optical unplug state transition step S301, in the state in which an optical signal has not been received from the source device processor 221, the sink controller 222*a* transmits, to the source device processor 221, an optical signal having an unplug pattern whose clock cycle is 20 μs or more through the sink transmission optical signal pattern generator 222*d*.

At this time, the sink controller 222*a* determines whether the sink device processor 222 receives the optical signal (S303).

When the optical signal is transmitted from the sink controller 222*a* to the sink device processor 222, the sink controller 222*a* may shift to a second sink unplug state transition step S305, and may process a signal as follows.

In the state in which the sink device 300 has not been connected, the sink controller 222*a* transmits, to the source device processor 221, an optical signal having the unplug pattern whose clock cycle is 20 μs or more through the sink transmission optical signal pattern generator 222*d*.

At this time, the sink controller 222*a* determines whether the sink device 300 is connected (S307).

When the sink device 300 is connected to the sink controller 222*a*, the sink controller 222*a* may shift to a second source unplug state transition step S309, and may process a signal as follows.

The sink controller 222*a* monitors a connection state between the source device 100 and the source device processor 211, while receiving an optical signal having the unplug pattern from the source device processor 221. At the same time, the sink controller 222*a* generates an optical signal having an idle pattern whose clock cycle is within a range of 10 ns to 90 ns through the sink transmission optical signal pattern generator 222*d*, and transmits the optical signal to the source device processor 221.

At this time, the sink controller 222*a* determines whether the optical signal having the idle pattern is received from the source device processor 221 through the sink received-optical signal pattern detector 222*c* of the sink device processor 222 (S311).

When the optical signal having the idle pattern is received from the source device processor 221 through the sink received-optical signal pattern detector 222*c* of the sink device processor 222, the sink controller 222*a* determines that the source device 100 is connected.

Accordingly, the sink controller 222*a* may shift to a second idle state transition step S313, and may process a signal as follows.

The sink controller 222*a* waits in order to receive a control and management signal for controlling and managing a connection link and a connection device from the source device processor 221.

At this time, the sink controller 222*a* determines whether the control and management signal is received from the source device processor 221 (S315).

When the control and management signal is received from the source device processor 221, the sink controller 222*a* may shift to a second reception (RECV) state transition step S317, and may process a signal as follows.

The sink controller 222*a* converts the control and management signal, received from the source device 100, into an electrical signal, and transmits the electrical signal to the sink device 300. Furthermore, the sink controller 222*a* transmits, to the source device processor 221, an optical signal having an idle pattern whose clock cycle is within a range of 10 ns to 90 ns.

At this time, the sink controller 222*a* determines whether the transmission of the control and management signal from the source device in the second reception (RECV) state transition step S317 is terminated (S319).

If the optical signal having the idle pattern is received from the source device processor 221 and it is determined that the transmission of the control and management signal has been completed, the sink controller 222a may shift to a second wait state transition step S321, and may process a signal as follows.

The sink controller 222a has its state changed into a wait state in which the sink controller may receive a data signal from the sink device 300. Furthermore, the sink controller 222a generates an optical signal having an idle pattern whose clock cycle is within a range of 10 ns to 90 ns through the sink transmission optical signal pattern generator 222d, and transmits the optical signal to the source device processor 221.

At this time, the sink controller 222a determines whether a control and management signal for controlling and managing the connection link and the connection device is received from the sink device 300 (S323).

When receiving the control and management signal from the sink device 300, the sink controller 222a may shift to a second transmission (SEND) state transition step (S325), and may process a signal as follows.

The sink controller 222a converts the control and management signal, received as an electrical signal, into an optical signal, and transmits the optical signal to the sink transmission optical signal pattern generator 222d. Furthermore, the sink controller 222a converts the control and management signal into an optical signal having a data pattern whose clock cycle is within a range of 1 μs to 4 μs through the sink transmission optical signal pattern generator 222d, and transmits the optical signal to the source device processor 221.

Accordingly, the sink controller 222a determines whether the transmission of the control and management signal by the sink controller 222a has been completed (S327), and processes the data signal normally.

Figure 6:
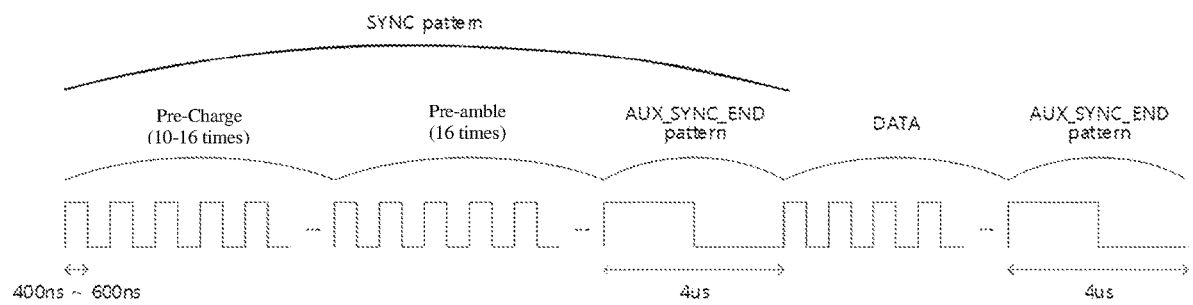
FIG. 6 is a diagram for describing forms of AUX channel signals which may be checked in the source signal pattern detector and sink signal pattern detector of the repeater device according to an embodiment of the present disclosure.

FIG. 6 is a diagram for identifying forms of signal patterns, which may be checked in the source signal pattern detector and sink signal pattern detector of the repeater device according to an embodiment of the present disclosure.

A process of transmitting a control and management signal for controlling and managing a connection link and a connection device in the source signal pattern detector 221b and sink device processor 222b of the repeater device according to an embodiment of the present disclosure may be specifically described with reference to FIG. 6.

When starting to transmit a control and management signal for controlling and managing a connection link and connection device of an AUX channel to the source signal pattern detector 221b or the sink signal pattern detector 222b, respectively, the source device 100 or the sink device 300 transmits a SYNC pattern by which valid data can be identified prior to the transmission of actual data.

The SYNC pattern may be composed of three patterns of Pre-Charge, Pre-amble, and AUX_SYNC_END.

The source device 100 or the sink device 300 first transmits a Pre-charge signal to the source signal pattern detector 221b or the sink signal pattern detector 222b, respectively.

The Pre-charge signal may be transmitted 10 to 16 times in a clock pattern having a cycle of 1 μs.

Thereafter, the source device 100 or the sink device 300 transmits a Pre-amble signal to the source signal pattern detector 221b or the sink signal pattern detector 222b, respectively.

The Pre-amble signal may be transmitted 16 times in a clock pattern having a cycle of 1 μs.

Furthermore, the source device 100 or the sink device 300 transmits an AUX_SYNC_END signal to the source signal pattern detector 221b or the sink signal pattern detector 222b, respectively. The AUX_SYNC_END signal may have a clock pattern having a cycle of 4 μs.

When the transmission of the SYNC pattern is performed, a control and management signal for controlling and managing an actual connection link and an actual connection device is transmitted through Manchester coding. Thereafter, the AUX_SYNC_END signal is transmitted.

Based on the process of transmitting the AUX channel signal, the source signal pattern detector 221b or the sink signal pattern detector 222b may detect the transmission start and transmission completion signals of the control and management signal and transmit the transmission start and transmission completion signals to the source controller 221a or the sink controller 222a, respectively.

The source signal pattern detector 221b or the sink signal pattern detector 222b determines the transmission start of the control and management signal through the Pre-charge signal. When data starts to be received through the AUX pin, the source signal pattern detector 221b or the sink signal pattern detector 222b counts the retention time of the data. The counting of the retention time is terminated when the state of the data changes from "HIGH" to "LOW" or from "LOW" to "HIGH." Furthermore, when the retention time of the data is 400 to 600 ns, it may be said to be Pre-charge. If the number of times of the data received through the AUX pin is checked to be three times or more as Pre-charge, the source signal pattern detector 221b or the sink signal pattern detector 222b notifies the source controller 221a or the sink controller 222a of the transmission start of the control and management signal.

When the transmission of the control and management signal is completed, the source device 100 or the sink device 300 transmits the AUX_SYNC_END signal to the source signal pattern detector 221b or the sink signal pattern detector 222b and maintains the last data. The AUX_SYNC_END pattern is a clock pattern having a cycle of 4 μs. The AUX_SYNC_END pattern may be included in a data pattern, that is, an optical signal having the clock cycle within the range of 1 μs to 4 μs. The source signal pattern detector 221b or the sink signal pattern detector 222b may check the transmission completion of the control and management signal based on the AUX_SYNC_END pattern. When the retention time of the data is counted, if the retention time of the data is longer than the AUX_SYNC_END pattern, the source signal pattern detector 221b or the sink signal pattern detector 222b transmits, to the source controller 221a or the sink controller 222a, a signal indicating that the transmission of the control and management signal has been completed.

Figure 7:
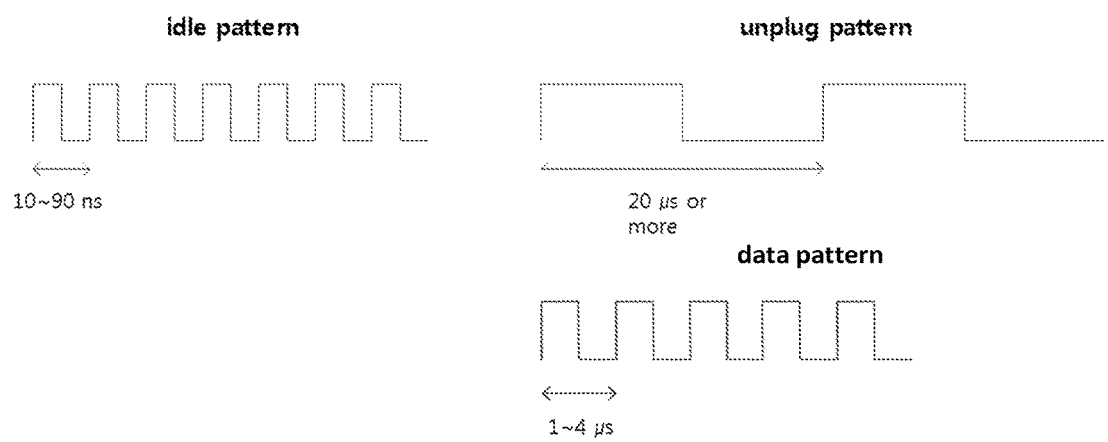
FIG. 7 is a diagram for describing forms of patterns of optical signals generated by the optical signal pattern generator of the repeater device according to an embodiment of the present disclosure.

FIG. 7 is a diagram for describing forms of patterns of optical signals generated by the optical signal pattern generator of the repeater device according to an embodiment of the present disclosure.

Patterns of optical signals generated by the optical signal pattern generator of the repeater device according to an embodiment of the present disclosure may be described with reference to FIG. 7.

The source transmission optical signal pattern generator 221d or the sink transmission optical signal pattern generator 222d may transmit a state according to the processed side channel signal to the sink received-optical signal pattern detector 222c and the source ORX signal pattern detector 221c connected to the other end, respectively. In this case, the source transmission optical signal pattern generator 221d or the sink transmission optical signal pattern generator 222d may form three patterns and provide optical signals including the respective three patterns.

The source transmission optical signal pattern generator 221d or the sink transmission optical signal pattern generator 222d may configure an unplug pattern, an idle pattern, and a data pattern based on an optical signal clock cycle according to a method of transmitting the optical signal.

The unplug pattern may be selected when a link between devices is not set up. The idle pattern may be selected when a control and management signal for controlling and managing a connection link and a connection device is not transmitted or received in the state in which a link between devices has been connected. Furthermore, the data pattern may be selected when a control and management signal for controlling and managing a connection link and a connection device is transmitted, and an optical signal may be transmitted.

The unplug pattern is transmitted when the DisplayPort is not connected to the interface of the sink device 300 or the optical fiber cable is not connected to the interface of the sink device 300. In an embodiment of the present disclosure, the unplug pattern may include a method of transmitting an optical signal in a clock cycle of 20 μs or more. Furthermore, the idle pattern may include a method of transmitting an optical signal in a clock cycle within a range of 10 to 90 ns. The idle pattern may indicate the state in which an AUX channel signal has not been transmitted. Furthermore, the data pattern may include a method of transmitting an optical signal in a clock cycle within a range of 1 μs to 4 μs, as an AUX channel signal actually transmitted by the source device 100 or the sink device 300.

According to an embodiment of the present disclosure, an optical fiber cable is used as a path through which the side channel composed of setup between devices and a control signal is transmitted or received in addition to the main link for the transmission and reception of video and audio data in the DisplayPort. A noise influence and a data loss can be prevented, and the limits of a transmission distance can be overcome.

Furthermore, there can be provided the repeater device for a DisplayPort side channel and an operating method thereof, having effects in that the side channel having a characteristic of bidirectional communication can be mixed with a copper wire in order to transmit an electrical signal along with the main link composed of an optical fiber cable and the complexity of maintenance and repair thereof can be reduced and simplified.

Furthermore, while the present disclosure has been particularly shown and described with reference to exemplary embodiments thereof, it is to be understood that the present disclosure is not limited to the disclosed exemplary embodiments, but, on the contrary, It will be understood by those skilled in the art that various changes and modifications may be made without departing from the spirit and scope of the present disclosure.

What is claimed is:

1. A repeater device of a DisplayPort comprising:
a source device processor which transmits or receives an electrical signal of a side channel data of the display port to or from a source device and processes repeater data; and
a sink device processor which transmits or receives an electrical signal of a side channel data of the display port to or from a sink device and processes repeater data,
wherein the source device processor or the sink device processor comprising a controller processes repeating of the side channel data of the display port using the repeater data which is obtained by transforming the electrical signal to an optical signal,
wherein the sink device processor comprises a sink controller configured to transmit, to the source device processor, repeater data obtained by converting and processing an electrical signal, received from the sink device, into an optical signal and to transmit, to the sink device, repeater data obtained by converting and processing an optical signal, received from the source device processor, into an electrical signal,
wherein the sink device processor further comprises:
a sink signal pattern detector configured to transmit, to the sink controller, a control and management signal for controlling and managing a connection link and a connection device with the sink device;
a sink reception optical signal pattern detector configured to transmit, to the sink controller, matching information that matches a preset pattern according to an optical signal pattern received from the source device processor; and
a sink transmission optical signal pattern generator configured to generate a preset optical signal pattern based on an optical signal received from the sink controller and to transmit the optical signal to the source device processor, and
wherein the sink transmission optical signal pattern generator selects a transmission method using one of an unplug pattern, an idle pattern, and a data pattern according to an optical signal clock cycle and generates a transmission pattern of the repeater data.

2. The repeater device of claim 1, wherein the source device processor comprises a source controller configured to transmit, to the sink device processor, repeater data obtained by converting and processing an electrical signal, received from the source device, into an optical signal and transmit, to the source device, repeater data obtained by converting and processing an optical signal, received from the sink device processor, into an electrical signal.

3. The repeater device of claim 2, wherein the source device processor comprises:
a source signal pattern detector configured to transmit, to the source controller, a control and management signal for controlling and managing a connection link and a connection device with the source device;
a source reception optical signal pattern detector configured to transmit, to the source controller, matching information that matches a preset pattern according to an optical signal pattern received from the sink device processor; and
a source transmission optical signal pattern generator configured to generate a preset optical signal pattern based on an optical signal received from the source controller and to transmit the optical signal to the sink device processor.

4. The repeater device of claim 1, wherein the source device processor and the sink device processor are connected by a core of at least two optical fiber cables and transmit and receive the repeater data as the optical signal.

5. The repeater device of claim 1, wherein the electrical signal comprises one or more of a control and management signal for controlling and managing a connection link and a connection device, a connection check signal for checking whether the sink device and the sink device processor are connected, and a signal for checking whether cables of the source device and the source device processor are connected.

6. The repeater device of claim 1, wherein the data pattern, the unplug pattern and the idle pattern are identified by clock cycle ranges of an optical signal.

7. An operating method of a repeater device for a DisplayPort side channel, the operating method comprising:
processing repeater data, by a source device processor, by transmitting or receiving an electrical signal of a side channel data of a display port to or from a source device; and
processing repeater data, by a sink device processor, by transmitting or receiving an electrical signal of a side channel data of the display port to or from a sink device,
wherein the repeater data is obtained by transforming the electrical signal to an optical signal for processing repeating of the side channel data of the display port,
wherein the sink device processor comprises a sink controller configured to transmit, to the source device processor, repeater data obtained by converting and processing an electrical signal, received from the sink device, into an optical signal and to transmit, to the sink device, repeater data obtained by converting and processing an optical signal, received from the source device processor, into an electrical signal,
wherein the sink device processor further comprises:
a sink signal pattern detector configured to transmit, to the sink controller, a control and management signal for controlling and managing a connection link and a connection device with the sink device;
a sink reception optical signal pattern detector configured to transmit, to the sink controller, matching information that matches a preset pattern according to an optical signal pattern received from the source device processor; and
a sink transmission optical signal pattern generator configured to generate a preset optical signal pattern based on an optical signal received from the sink controller and to transmit the optical signal to the source device processor, and
wherein the sink transmission optical signal pattern generator selects a transmission method using one of an unplug pattern, an idle pattern, and a data pattern according to an optical signal clock cycle and generates a transmission pattern of the repeater data.

8. The operating method of claim 7,
wherein the processing the repeater data, by the source device processor, comprises:
transmitting, by the source device processor, to the sink device processor, repeater data obtained by converting and processing the electrical signal, received from the source device, into an optical signal and transmitting, to the source device, repeater data obtained by converting and processing an optical signal, received from the sink device processor, into an electrical signal; and
wherein the processing the repeater data, by the sink device processor, comprises:
transmitting, by the sink device processor, to the source device processor, repeater data obtained by converting and processing the electrical signal, received from the sink device, into an optical signal and transmitting, to the sink device, repeater data obtained by converting and processing an optical signal, received from the source device processor, into an electrical signal.

9. The operating method of claim 8, further comprising: detecting, a transmission start and completion of a control and management signal for controlling and managing a connection link and a connection device, when the electrical signal of the side channel of the display port received from the source device or the sink device is the control and management signal.

10. The operating method of claim 8, further comprising: generating an optical signal pattern to be transmitted to the source device or the sink device according to preset pattern information based on the repeater data obtained by converting and processing the optical signal.

11. The operating method of claim 8, wherein the electrical signal of the side channel of the display port comprises one or more of a control and management signal for controlling and managing a connection link and a connection device, a connection check signal for checking whether the sink device and the sink device processor are connected, and a signal for checking whether cables of the source device and the source device processor are connected.

* * * * *